United States Patent [19]

Stein et al.

[11] 3,729,088
[45] Apr. 24, 1973

[54] ROLLER CONVEYOR
[75] Inventors: Hans Vom Stein, Wermelskirchen; Dieter Specht, Dhunn, both of Germany
[73] Assignee: Hans Vom Stein OHG, Dhunn, Germany
[22] Filed: June 10, 1971
[21] Appl. No.: 151,645

[30] Foreign Application Priority Data
  June 16, 1970 Germany......................P 20 29 647.3
  Ap. 20, 1971 Germany......................P 21 18 987.7

[52] U.S. Cl. ..............................................198/127 R
[51] Int. Cl..............................................B65g 13/02
[58] Field of Search ...........................198/34, 127 R; 192/126

[56] References Cited
UNITED STATES PATENTS
3,066,788  12/1962  Christiansen...........................198/34

3,124,234  3/1964  Mician..............................198/127 R

Primary Examiner—Edward A. Sroka
Attorney—Michael S. Striker

[57]  ABSTRACT

A plurality of rolling elements are mounted in a support longitudinally spaced and turnable about axes extending transversely to the elongation. A continuously operable drive turns one member of a clutch which is normally engaged. A sensing device normally projects beyond the general plane defined by the rolling elements and on which a load travels, and can be downwardly deflected when a load contacts it. A worm constitutes the other part of the clutch and drives a gear fast with one of the rolling elements. The worm can be disengaged, thereby disengaging the clutch, when the mechanical sensing arrangement is depressed by a load and thereby engages with the thread or screw on the worm, whereby the latter is caused to carry out axial displacement in a sense disengaging the clutch, by the force of the drive which normally drives the clutch.

12 Claims, 10 Drawing Figures

Patented April 24, 1973
3,729,088
4 Sheets-Sheet 1
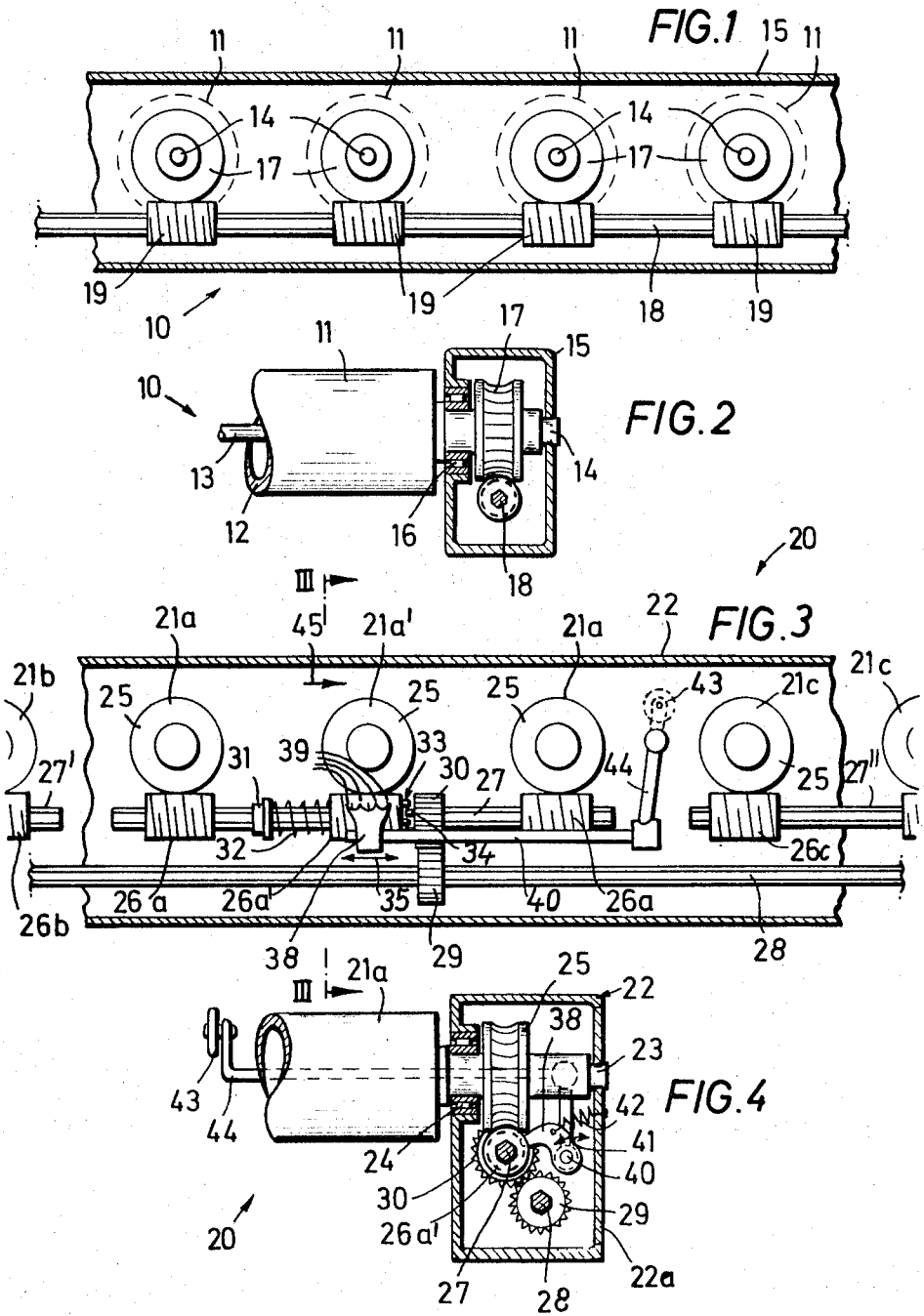

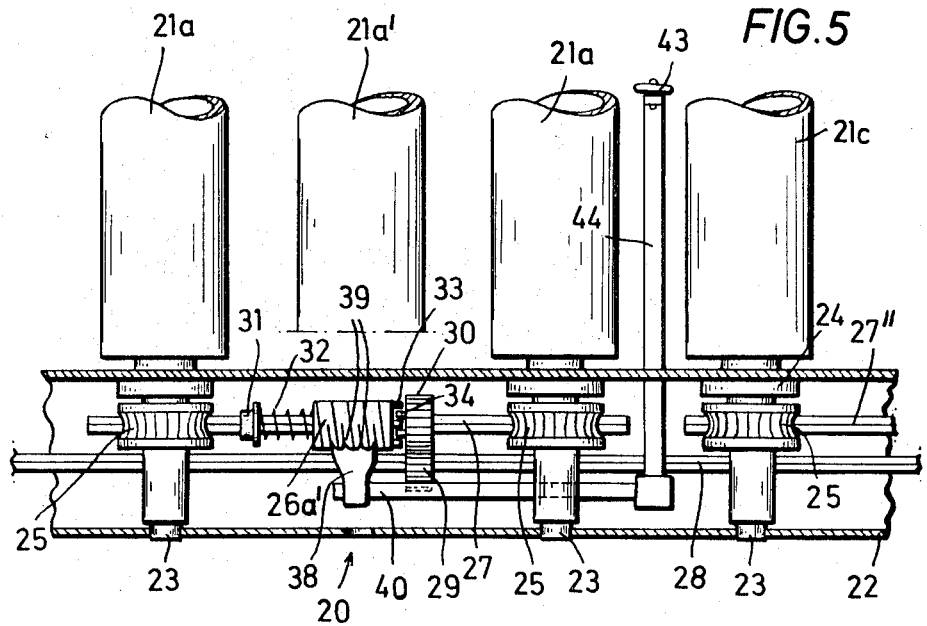
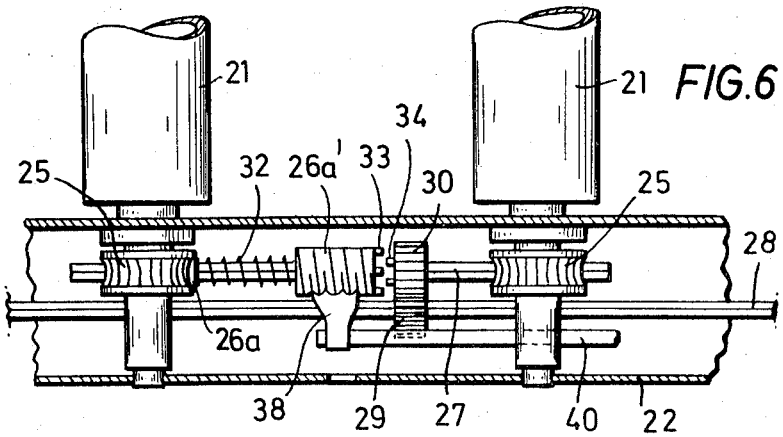

INVENTOR
HANS VOM STEIN
DIETER SPECHT
BY

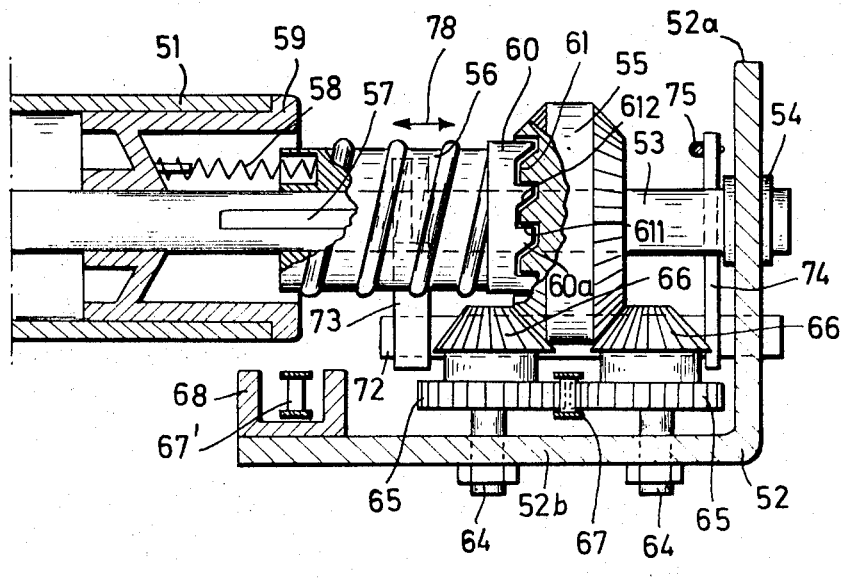
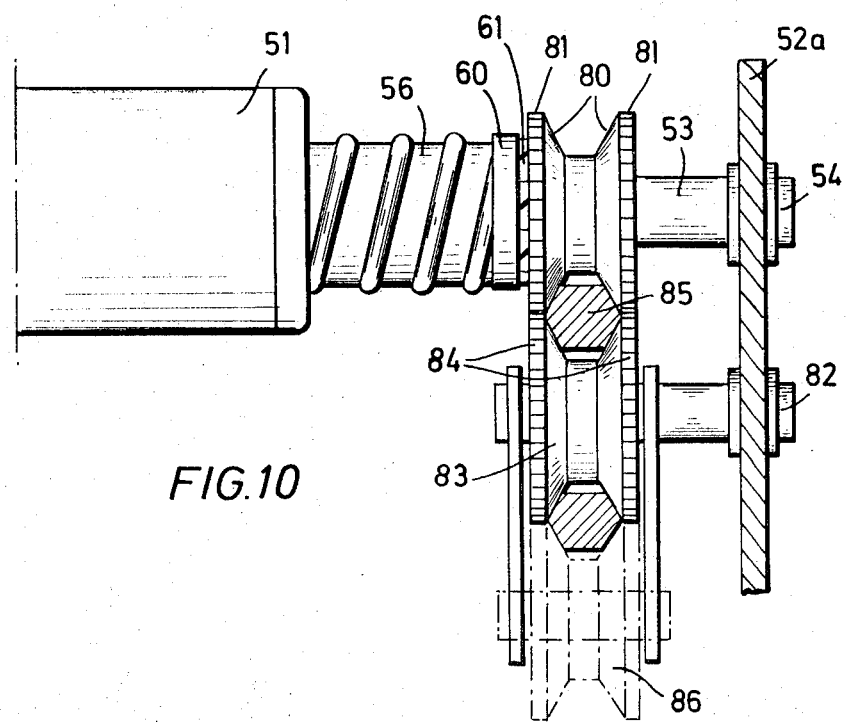

ROLLER CONVEYOR

BACKGROUND OF THE INVENTION

The present invention relates generally to a conveyor, and more particularly to a roller conveyor.

The term roller conveyor as used herein refers to a conveyor using roller elements, irrespective of the configuration of these roller elements. Roller conveyors per se are of course already known, and are utilized for the transportation of loads, for instance cartons, boxes or the like. Generally speaking they use two parallel elongated supports between which the conveyor roller elements are mounted for rotation about axes which extend transversely of the elongation of the supports. Such roller conveyors are categorized as to two basic types, namely as to whether the rollers are driven or are non-driven. If the rollers are non-driven then the conveyor depends for movement of the load over it either upon an initial impact imparted to the load, or upon an inclination of the general plane of the conveyor, or both. Of course, it is also possible to pull the load or otherwise advance it.

If, however, the conveyor is of the type in which rollers are driven, then it is these rollers which by contact with the load resting on them will advance the load along the conveyor.

It is also already known to provide roller conveyors which are subdivided into sections, with the load in one section being stopped from further movement —by switching off the drive of the rollers of that section— when the section ahead is not yet cleared of the load. Conveyors of this type are utilized if the loads to be carried are highly susceptible to damage, for instance to impact, breakage or the like, such as containers with glass or the like. With these constructions it is possible to avoid impacting of one moving element or load component against another, and thereby to avoid the possibility of breakage of the contents of these elements. This is achieved in that in these constructions a mechanical sensing device is depressed by load passing over any section of the conveyor, which then deactivates the drive for the rollers of the upstream or preceding section, so that no load is advanced from this preceding section. The control is effected in that the mechanical sensing device, when it is depressed by a load item, disengages a coupling which may be located within the roller itself or may be associated with the drive transmission therefor.

The problem with this prior-art approach is that it is difficult to obtain the force necessary for disengaging the coupling, simply by the depressing force exerted by the load upon the mechanical disengaging element. This is particularly so because the force exerted upon the mechanical disengaging element must usually be transmitted via a relatively long and complicated linkage to the coupling, and as a result the conveyors constructed in accordance with the prior art and utilizing the aforementioned approach, are usually rather complicated in their construction and therefore expensive, aside from the fact that they are susceptible to malfunction or breakdown.

SUMMARY OF THE INVENTION

It is, accordingly, an object of the present invention to avoid the aforementioned disadvantages.

More particularly it is an object of the present invention to provide an improved roller conveyor which is not possessed of these disadvantages.

A concomitant object of the invention is to provide such an improved roller conveyor having at least some of its rolling elements driven, but which is simple and inexpensive in its construction.

Still a further object of the invention is to provide such an improved roller conveyor which is highly reliable in its operation, has a long life and requires little if any maintenance.

Still another object of the invention is to provide such an improved roller conveyor which can be readily assembled from individual elements, and in accordance with the building-block approach.

An object of the invention is also to provide such an improved roller conveyor in which the drive for rollers can be disengaged in response to depressing or otherwise operating of a mechanical sensing means by the advancing load, but in which the actual disengagement of the drive is carried out not by the force exerted during such depressing and transmitted for instance to the coupling, but is carried out by the drive itself. Thus, the sensing arrangement has the purpose, in the present invention, of initiating in effect a signal and transmitting it, rather than actually having to disengage the drive.

In pursuance of the above objects, and others which will become apparent hereafter, one feature of the invention resides in a roller conveyor which, briefly stated, comprises elongated support means, and a plurality of rolling elements mounted in the support means spaced longitudinally thereof and being turnable about axes extending transversely to the elongation of the support means. The rolling elements together define an upwardly directed support surface on which loads are adapted to advance in a predetermined direction. Continuously operable drive means is provided and normally engaged clutch means which drivingly connects the drive means with at least some of the rolling elements for turning them about their respective axis. The clutch means is disengageable for interrupting such driving connection. Mechanical sensing means normally projects upwardly beyond the general plane of the support surface and is deflectable downwardly in response to contact with an advancing load. Disengaging means is associated with the sensing means and is operative for effecting disengagement of the clutch means in response to deflection of the sensing means and in cooperation with the drive means.

With this construction, which according to the present invention utilizes as one component of the clutch means a worm which can be moved between two positions in one (the normal one) of which it engages with axially projecting teeth corresponding projections on a second component of the clutch means, the mechanical sensing means engages a contact or disengaging element with the screw on the worm so that, with the contact element being fixedly mounted, the worm upon such engagement is caused to move axially of itself to the opposite position, thereby disengaging from the second component of the clutch means. The force for this axial displacement is derived from the drive means itself which continues to turn the second component of the clutch means, and via the same the worm until such time as the teeth of the latter become disengaged from this second component.

Subsequently, the mechanical sensing arrangement is released by the load, that is when the latter moves on or is removed, then biassing means provided for this purpose removes the disengaging means from engagement with the screw of the worm, and the latter is then returned by biassing means into coupling engagement with the second component of the clutch.

In a currently preferred embodiment of the invention, the worm will be mounted on the shaft of the rolling element whose drive is to be controlled.

It is also possible, according to an embodiment of the invention, to utilize a double-bevel gear as the second component of the clutch means, having two axially spaced annuli of gear teeth, and to provide two bevel gears each of which is mounted freely turnably about an shaft extending at right angles to the axis of the rolling element carrying the double bevel gear and meshing with one of the annuli of gear teeth of the latter. Each of the two bevel gears is rigidly connected with a sprocket wheel with the two sprocket wheels being located in a common plane, and a run of a continuously driven chain engages with at least one of the sprocket wheels.

Another embodiment of the invention provides for the worm to be mounted on a separate shaft which extends in parallelism with the main shaft, the latter extending along the rolling element, that is in the longitudinal direction of the elongated support means. In this embodiment the drive shaft will carry fixedly connected thereto a pinion or similar gear, which meshes with an additional pinion or similar gear on the intermediate shaft, with the additional pinion then being the second component of the clutch means. In this embodiment a worm wheel may be mounted on the shaft of the rolling element, meshing with the worm so that the two together constitute at the same time a part of the drive transmission for the rolling element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a partially broken away fragmentary side-elevational section of a roller conveyor in which the rolling elements are driven by a worm drive.

FIG. 2 is a vertical fragmentary section through FIG. 1;

FIG. 3 is a view similar to FIG. 1 but illustrating a first embodiment of the invention;

FIG. 4 is a section similar to FIG. 2 but taken on FIG. 3 on line IV—IV thereof;

FIG. 5 is a fragmentary top-plan view of FIG. 3;

FIG. 6 is a view similar to FIG. 5 but illustrating a further embodiment of the invention;

FIG. 9 is a section taken on line IX—IX of FIG. 7, again with certain components omitted for the sake of clarity; and FIG. 10 is a view similar to FIG. 9 but illustrating a further embodiment of the invention.

DESCRIPTION OF THE PREFERRED EMBODIMENTS

Figure 7:
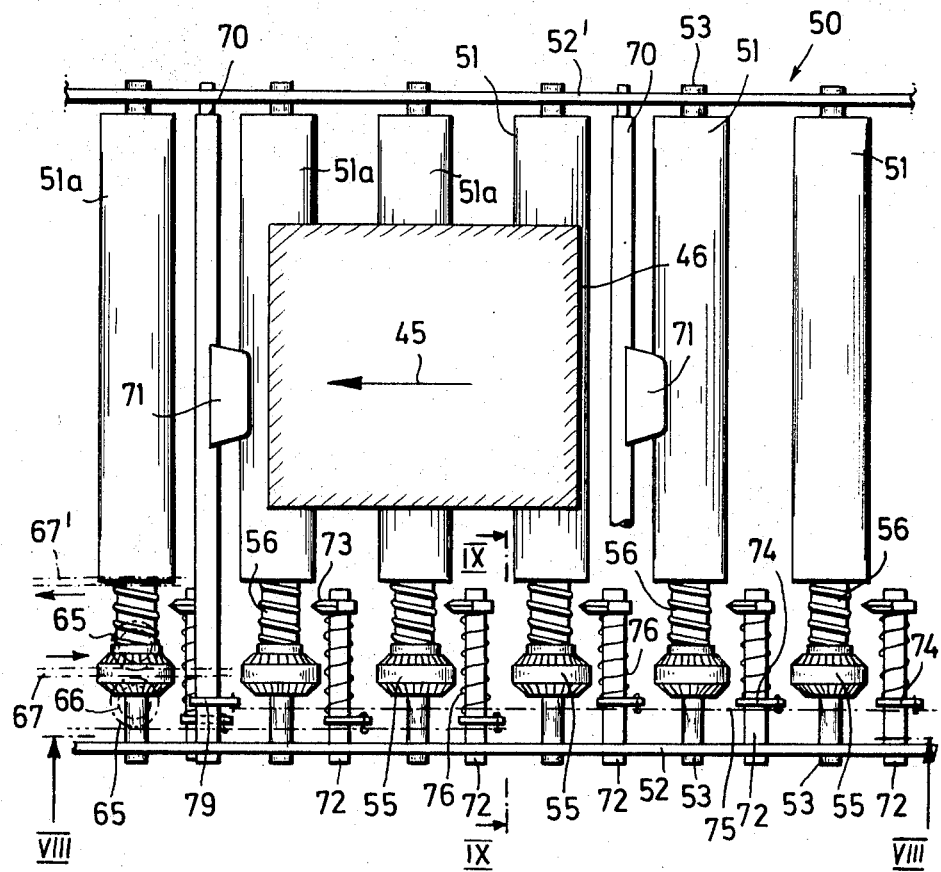
FIG. 7 is a somewhat diagrammatic top-plan view, in fragmentary illustration, of an additional embodiment of the invention.

Discussing now the drawing in detail, and dealing firstly with FIGS. 1 and 2, it will be seen that these Figures illustrate a roller conveyor which is fragmentarily shown and identified as a hole with reference numeral 10. It is provided with a plurality of axially spaced roller elements 11 which are here of cylindrical configuration and mounted for turning movement about axes which are defined by rotatable shafts 13. The rotatable shafts 13 are journalled in a pair of transversely spaced longitudinally extending support elements 15, of which one is illustrated. These support elements 15 may be of identical configuration and in FIG. 2 will show that one or both are of hollow box-shaped profile or cross-section. The shafts 13 each project beyond the opposite axial ends of the outer circumferential wall 12 of the respective rolling element 11, and are journalled in the respective supports 15 by means of suitable and well-known bearings. Outer end portions of the shafts 13 may also be journalled in the outwardly directed side walls of the element 15, and are identified with reference numeral 14. The upper wall portion, the lower wall portion and/or the outwardly directed side wall portion of either or both of the elements 15 may be made removable in manner known per se, in order to facilitate access to the interior for inspection and maintenance purposes.

FIG. 2 shows particularly clearly that located in the interior of one of the elements 15, that is the one which is illustrated, the end portion 14 of the respective rolling element 11 carries a worm wheel 17 which is made fast against rotation, so that it rotates with but not relative the end portion 14. Also located within the interior of the illustrated element 15, extending in parallelism with the elongation of the latter, is a drive shaft 18 which of course will have to be journalled for rotation, but for which the journalling elements are known and are therefore not believed to require illustration. Furthermore, it is to be understood that the drive shaft 18 can be rotated about its longitudinal axes continuously by means of a non-illustrated drive, such as an electromotor, and again it is pointed out that this is known and that an electromotor and the manner in which it can be connected with the drive shaft 18 for rotating the latter, are not believed to require illustration.

It will be seen that each of the roller elements 11 has associated with it one of the worm wheels 17, and each of the worm wheels 17 in turn has associated with it a worm 19 which is fixedly mounted on the shaft 18. For this purpose the illustrated embodiment of FIGS. 1 and 2 utilizes a shaft 18 which is of hexagonal cross section in its entirely or at least at those portions where it carries the worm 19. This is clearly illustrated in FIG. 2 and it will be understood that the worms 19 will have a central bore which is of mating cross-sectional configuration. The worms 19 not only cannot rotate with reference to the shaft 18, but also cannot be axially displaced relative thereto.

It is evident, of course, that in the construction illustrated in FIGS. 1 and 2 the driven shaft 18 turns the worms 19 which in turn transmit motion to the worm wheels 17, and with the latter being fixed with the portions 14 of the respective shafts 13, there is thereby rotation imparted to the rolling elements 11. Any loads resting on the rolling elements 11 are thereby advanced longitudinally of the conveyor.

Whereas in FIGS. 1 and 2 the drive connection between the shaft 18 and the rolling elements 11 cannot be terminated, except by terminating it for all of them, the embodiment of FIGS. 3-5 provides for the selected termination of the drive connection. In FIGS. 3-5 the roller conveyor per se is identified with reference numeral 20 and is provided with sets of roller elements of which one is illustrated in its entirety and composed of two roller elements 21a intermediate which there is located a roller element 21a'. The existance of additional sets is suggested by the roller elements 21b and 21c located at opposite axial sides of the illustrated set. Of course, any number of such sets may be provided. As in the preceding embodiment, the shafts of the roller element —identified with reference numeral 23— are journalled in bearings 24 of the longitudinally extending support elements 22 (one shown). Located within the hollow supporting element 22 the shafts 23 each carry a worm wheel 25, and FIG. 4 shows also that in this embodiment the outwardly directed side wall portion 22a of the element 22 can be removed for inspection or similar purposes.

The worm wheels 25 of the roller elements 21a each have camming with them a worm 26a; the worm wheel 25 of the roller element 21a' has camming with it a worm 26a'. The worm wheels of the roller elements 21b and 21c have camming with them worms 26d and 26c, respectively as is diagrammatically illustrated for purposes of explanation.

However, in the embodiment of FIGS. 3-5 the worms 26a, 26a' of the illustrated set of roller elements 21a, 21a' are mounted on a separate shaft 27. The set of roller elements 21b has a similar arrangement with the shaft here being identified with reference numeral 27', and a shaft 27'' is associated How these shafts are mounted for rotation is known to those skilled in the art. The drive shaft is identified with reference numeral 28 and is again driven in non-illustrated conventional manner by a suitable drive, for instance an electromotor or the like, with the shaft 28 carrying a pinion 29 which is fixedly connected to it. The pinion 29 cams with a second pinion 30 which is freely turnably mounted on the shaft section 27, and it will be appreciated that the same arrangement is true also for the shaft sections 27', 27''. The pinion 30 is not displaceable axially of the shaft section 27.

The worms 26a are mounted on the shaft section 27 for rotation with but not relative to the latter. They are not axially displaceable relative to the shaft section 27. The worm 26a', however, while it is also mounted for rotation with the shaft section 27, is slidable relative to the latter in the direction of the double-headed arrow 35. The shaft section 27 carries a shoulder or abutment 31 and between the latter and the worm 26a' there is an expansion spring 32 which surrounds the shaft section 27 and tends to displace the worm 26a' towards the right in FIG. 3. One axial end face of the worm 26a' faces towards the pinion 30 and is provided with projections 33 which extend axially and are circumferentially spaced about the axis of rotation of the worm 26a'. Cooperating projections 34 are provided on the juxtaposed axial end face of the pinion 30 so that they can engage with the projections 33, which is normally the case under the urging of the spring 32. When this is the case, the coupling constituted by the worm 26a and the pinion 30 is in engagement.

Adjacent the worm 26a' the member 22 carries a disengaging device or member 38 which is pivotable about a shaft 40 in the direction indicated by the doubleheaded arrow 41 in FIG. 4. It is provided with teeth or projections 39 which are so configurated that they can extend into the consecutive convolutions of the screw of the worm 26a'. A spring 42 is connected at one end with the side wall portion 22a of the member 22 and at the other end with the member 38, permanently tending to pivot the latter about the shaft 40 in clockwise direction, that is out of engagement with the worm 26a'.

In the illustrated embodiment of FIGS. 3-5 the direction in which loads are to be transported on the roller conveyor, is assumed to be towards the right in FIG. 3, as indicated by the arrow 45. To the right of the shaft section 27 there is located a mechanical sensing arrangement in form of an arm 43 carrying the illustrated roller and being connected via a linkage arrangement 44 with the shaft 40 which is pivotable about its longitudinal axis. Thus, when the arm 43 is depressed by a load advancing on the rolling elements in the direction of the arrow 45, it turns the shaft 40 and, because the member 38 is fast with the latter, moves the member 38 with its projections 39 into engagement with the screw of the worm 26a'. As long as such engagement is not the case, the engagement of the teeth or projections 33, 34 causes the motion of the pinion 30 —which is driven by the pinion 29— to be transmitted to the worm 26a' which, being fast with the shaft section 27, rotates the latter. Thus, motion is transmitted via all worms mounted on the shaft section 27 to the respectively cooperating worm wheels 25. However, when the engagement of the projections 39 of the member 38 with the worm 26a' takes place, then continued rotation of the worm 26a' by virtue of its engagement with the pinion 30 causes the worm 26a' to become axially displaced towards the left in FIG. 3, by screwing itself along the projections 39, until such time as the projections 33 and 34 become disengaged. It is thus the power of the drive itself which effects this disengagement of the coupling, not the weight exerted by the load acting upon the arm 43. Thus, at this time the roller elements 21a, 20a' are no longer driven and any load following the one that has depressed the arm 43, will come to rest on the set of such rolling elements but before it reaches the arm 43. Once the preceding load, which has depressed the arm 43, moves beyond the latter, the arm 43 is returned to its upper position, under the influence of the restoring spring 42, and this engages the projections 33 again with the projections 34, i.e. re-engages the coupling so that the roller elements 21a, 20a' are again driven.

It is pointed out that although the arm 43 in the illustrated embodiment is located between the roller element sets which utilize the shaft sections 27, 27'' in FIG. 3, it may in actual practice be more advantageous to locate the arm 43 further towards the right in FIG. 3, that is within the region of the shaft section 27'', in order to more reliably preclude the possibility that a load following the one which has disengaged the coupling might actually continue to move on the roller elements 21a, 21a' to such an extent as to keep the arm 43 depressed. In this case the coupling would not be re-engaged and the load could not be moved on until it would be moved out of engagement with the arm 43 manually, a practice which is obviously undesirable.

Merely for the sake of completeness it is emphasized that the sets of roller elements and associated shaft sections 27', 27'' are constructed in the same manner as the one which is illustrated in FIG. 3 and has the sets of roller elements 21a, 21a'' with the shaft section 27. A detailed discussion of these other sets and their arrangements is therefore believed to be superfluous.

Actually, FIG. 5 shows that in accordance with the currently preferred approach the rolling element 21a' which cooperates with the worm 26a' does not have a worm wheel 25 as to the other rolling elements 21a. Instead, the worm 26a' does not serve to drive the rolling element 21a' at all, but instead only constitutes a part of the two-part coupling of which the pinion 30 is the second part. The advantage of this is that the spring 32 —when it displaces the worm 26a' towards the right to re-start the drive by re-engaging the coupling— does not have to turn the rolling element 21a' (whose worm wheel 25, if it were provided, would be in mesh with the worm 26a') so that the spring 32 may be relatively weak.

In the embodiment of FIG. 6 we have illustrated a possibility which provides for mounting the worm 26a' and the pinions 29 and 30 in the space between two consecutive ones of the rolling elements 21. In this case, also, the worm 26a' serves only as one part of the two-part coupling, without directly driving one of the rolling elements 21. The remainder of the embodiment in FIG. 6 is the same as that in FIGS. 3–5. One other difference is the fact that in FIG. 6 it will be seen that the spring 32 need not abut against the separate shoulder 31 as shown in the preceding embodiment, but can also abut with its free end against the adjacent worm 26a mounted on the same shaft section 27 as the worm 26a'.

A particular advantage of the embodiments illustrated and discussed thus far, beyond the advantages which have already been pointed out, is that the driven rolling elements also serve as brake rollers in the event that for any reason whatever the loads moving over the roller conveyor might advance at a speed which is greater than the speed imparted to the rolling elements by the drive. This is usually undesirable and it will be appreciated that if this should occur, that is if a load should advance at a faster rate than that at which the rolling elements are driven by the associated drive, the load cannot impart such a higher speed in form of increased revolutions to the rolling elements because it would have to turn the worm drives which are provided, and such worm drives are self-locking and cannot be speeded up in this manner. The result of this is that even if a load should initially move too fast, it would be braked very rapidly by the friction of its contact with the rolling elements which in this case would operate as brake rollers.

It is clear, of course, that the shaft sections 27, 27', 27'' could also all be united in form of single unitary shaft. However, in this case it would not longer be possible to interrupt the drive for a specific number of rolling elements, and instead all such rolling elements as are mounted on the single shaft replacing the shaft sections 27, 27' and 27'', would then have to be either driven simultaneously or stopped simultaneously.

Merely parenthetically, because this will be self-evident, it is pointed out that the shaft sections 27, 27', 27'' could also be provided—in addition to the axially non-displaceable worms 26a—with further axially displaceable worms, for instance three or four or more or with only a single one instead of two as illustrated.

In the preceding embodiments the worm constituting a part of the coupling always also was a part of the drive transmission for the associated rolling element. In the here following embodiments of FIGS. 7–9 and 10 this is no longer the case, and instead the worm now only constitutes a part of the coupling without having the additional function of driving one of the rolling elements directly.

Figure 8:
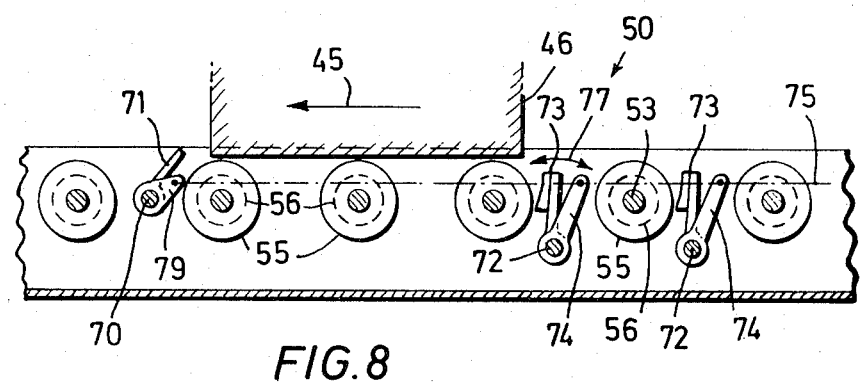
FIG. 8 is a section taken on line VIII—VIII of FIG. 7, with certain components having been omitted for the sake of clarity of illustration.

Discussing firstly the embodiment in FIGS. 7–9 it will be seen that the roller conveyor is identified in toto with reference numeral 50. For purposes of orientation a load to be carried, such as a box, crate or the like, is illustrated and identified with reference numeral 46, its direction of transportation on the roller conveyor being identified with the arrow 45. In this embodiment two longitudinal supporting elements 52, 52' are transversely spaced extending in parallelism with one another. Located between them and rotatably journalled in both of them with their respective shafts or axes 53 are cylindrical roller elements 51, 51a.

At least one of the support elements (in this case the one which is identified with reference numeral 2 and is the lowest in FIG. 7 and shown in cross-section in FIG. 9) is of angular profiled configuration, having a vertical arm 52a and a horizontal arm 52b. The shafts 53 of the roller elements are journalled in the vertical arm 52a by means of bearings 54. Of course, the shafts 53 are similarly journalled in the other support element 52'.

In the illustrated embodiment the shafts 53 at the side of the support element 52 extend beyond the axial ends of the rolling elements and on the extension they carry a double bevel gear 55 which is freely turnably mounted on the shaft 53. The latter further has mounted on it a worm 56 which is located between the roller element 51 and the gear 55. Unlike the latter, however, the worm 56 cannot turn with reference to the shaft 53, for which purpose it is mounted in non-rotatable relationship on the latter, for instance by means of the illustrated Woodruff-key connection 57. However, the worm 56 is movable axially of the shaft 53 in the direction of the arrow 78 and is urged towards the right in FIG. 9 by biasing means, illustrated here as expansion springs 58 which are located between the left-hand end (in FIG. 9) of the worm 56 and the bottom wall of a recess 59 provided in the adjacent end portion of the associated roller element 51. Thus, the springs 58, of which several may be distributed circumferentially of the shaft 53, permanently tend to urge the worm 56 towards the right.

At the end face which is the right-hand one in FIG. 9, the worm 56 is provided with a collar 60 having an annulus of concentrically arranged projections 60a and the juxtaposed end face of the gear 55 is provided with a corresponding annulus of gear teeth 61 which can mesh with the projections 60a. Thus, the springs 58 normally tend to effect meshing and engagement of the projections 60a and 61, thus engaging the coupling constituted by the elements 56 and 55. Note should be taken of the fact that each of the projections or teeth 60a has two circumferentially spaced lateral edges, one of which is identified with reference numeral 611 and extends in parallelism with the axis of the shaft 53 whereas the other is identified with reference numeral 612 and is inclined to this axis.

Two further shafts 64 are mounted in the horizontal arm 52b of the support member 52, being essentially vertically oriented. On each of these shafts 64 there is turnably mounted a bevel gear 66, with each of these bevel gears 66 camming with one of the annuli of gear teeth on the double-bevel gear 55. There are further provided two sprocket wheels 65 which are of one piece with the respective bevel gears 66 or which are rigidly connected with them, being also turnably mounted on the shafts 64 together with the bevel gears 66. The sprocket wheels 65 are located in a common plane and are spaced at such a distance that a run 67 of a drive chain which extends through the gap between the two sprocket wheels 65 will engage both of them for driving the latter. The return run 67' of this same chain is guided in a U-cross-sectioned rail 68 which is also provided on the arm 52b laterally spaced from the shafts 64. Of course, the chain 67, 67' will be continuously driven by a non-illustrated drive motor via a suitable sprocket wheel which is also not shown, and this is conventional and need not be described because it is known per se.

Longitudinally spaced at certain distances, shafts 70 (only one shown) are journalled between and in the support members 52 and 52'. Each of these shafts 70 carries a sensing arm 71 which in its normal or rest position extends slightly above the general plane of the upper support surface constituted by the rolling elements 51, 51a, so as to extend into the path of movement of an advancing load 46. The shafts 70 carry adjacent their journalling in the support member 52, arms 79 the free ends of which have secured to them a wire rope or similar elongated force-transmitting element 75. Located beneath the driven rolling elements there are mounted shafts 72 in the upright arm 52a of the support element 52, and these shafts 72 each carry a radially extending arm 74 to the free end of which the element 75 is also connected. There is further provided a radial arm 73 which turns jointly with the arm 74 and constitutes the equivalent of the element 38 in FIGS. 3-5, in that it can be moved into engagement with the screw threads on the arm 56. A restoring spring 76 tends to displace the arm 73 in FIG. 8 in clockwise direction, as indicated by the arrow 77.

Attention is directed to the fact that the arm 71 which is located at the left in FIG. 7 is connected via the element 75 with the elements 73 of the rolling elements 51, that is with rolling elements which are spaced from it in longitudinal direction of the conveyor. Similarly, the rolling elements 51a are controlled by a non-illustrated arm 71 which is located further left of the one that is shown. The purpose, of course, is to subdivide the roller conveyor into sections with the control arm 71 for one section always being located in the upstream or preceding. The reasons for this have already been discussed earlier and it only remains to point out that quite evidently greater distances than those pointed out or suggested herein may also be selected between the respective arm 71 and the roller elements which are controlled by it.

Normally, with this embodiment the continuously driven chain 67, 67' will drive the sprocket wheels 65 and via these the bevel gears 66. This means that the gears 55 (of which a requisite number will of course be provided) are constantly driven. Because the worms 56 are ordinarily in coupling engagement with the respective gears 55 via the projections 60a, 61, and because they cannot turn with respect to the shafts 53, this results in driving —that is rotation—of the associated roller elements. When, however, during the course of movement of a load 46 the latter engages one of the arms 71 and depresses it, the latter is displaced (See FIG. 8) in counterclockwise direction. As a result, similar displacement in counterclockwise direction is effected for the arms 74 and the elements 73 via the element 75. This causes the elements 73 to engage into the screw threads of their associated worms 56 and, because the latter continue to turn, they engage the elements 73 with these screw threads are caused (because the elements 3 do not yield) to screw themselves towards the left (in FIG. 9) against the opposition of the springs 58. This continues until such time as the worms have moved towards the left to a sufficient extent so that the projections 60a become disengaged from the projections 61 so that the respective roller elements 51 are now no longer driven because the coupling connection has been interrupted.

On the other hand, when the load 46 moves on, that is frees the depressed arm 71, which is possible because it is actually now resting on the rollers 51a, whose controlling arm is located in the next-following section of the roller conveyor, then the previously depressed arm 71 is freed and returns to its original position (in clockwise direction in FIG. 8). This causes the elements 73 to become disengaged from the respective worms 56 which latter are then displaced by the springs 58 in axial direction until they again move into coupling engagement with the associated gears 55.

There remains the embodiment in FIG. 10. This is rather similar to the embodiment in FIGS. 7–9, and like components have been identified with like reference numerals. A detailed discussion of these components is therefore not believed to be necessary.

Where the embodiment of FIG. 10 differs from that of FIGS. 7–9 is in the replacement of the gear 55 with a component 80. In particular, the component 80 is a pulley wheel having radial flanges which are provided with annuli 81 of gear teeth. A second similar pulley wheel 83 is mounted on a shaft 82 which is turnably journalled in the upright arm 52a of the element 52; the wheels 80 and 81 are located in a common plane transverse to their respective axes of rotation, and the radial flanges of the pulley wheel 83 are also provided with annuli of gear teeth 84 each of which meshes with an annulus of gear teeth 81 of the wheel 80.

Instead of the chain of the preceding embodiment, FIG. 10 utilizes a drive belt 85 which passes between the wheels 80 and 81 and drives the latter. The belt 85 is of course in turn continuously driven by a non-illustrated drive, such as a motor or the like.

In order to support the lower or return run of the belt 85, supporting pulleys 86 may provided at certain distances from one another, as illustrated in broken lines in FIG. 10 for orientation. Inasmuch as the wheel 80 replaces the gear 55 of FIG. 7-9 it will be understood without particular emphasis that its axial end face which faces left in FIG. 10 is provided with the same teet 61 for coupling engagement with the worm 56, as have been discussed in FIGS. 7-9 with reference to the gear 55.

It will be understood that each of the elements described above, or two or more together may also be found in other types of constructions differing from the types described above.

While the invention has been illustrated and described as embodied in a roller conveyor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims

We claim:

1. In a roller conveyor, in combination, elongated support means; a plurality of rolling elements mounted in said support means spaced longitudinally thereof and being turnable about axes extending transversely to the elongation of said support means, said rolling elements together defining an upwardly directed support surface on which loads are adapted to advance in a predetermined direction; drive means including at least one continuously driven first gear; normally engaged coupling means, comprising at least one second gear meshing with said first gear and having an endface, and at least one rotatable and axially shiftable worm having a thread and an axial endface, said endfaces comprising axially interengageable coupling portions; mechanical sensing means normally projecting upwardly beyond the general plane of said support surface and being deflectable downwardly in response to contact with an advancing load; and disengaging means associated with said sensing means and responsive to deflection of the same for effecting axial shifting of said worm and concomitant disengagement of said coupling portions.

2. In a roller conveyor, in combination, elongated support means; a plurality of rolling elements mounted in said support means spaced longitudinally thereof and being turnable about axes extending transversely to the elongation of said support means, said rolling elements together defining an upwardly directed support surface on which loads are adapted to advance in a predetermined direction; drive means including at least one continuously driven first gear; normally engaged coupling means, comprising at least one second gear meshing with said first gear and having an endface, and at least one rotatable worm having a thread and an axial endface, said endfaces comprising interengageable coupling portions including at least some axial projections adapted to engage with said coupling projections and being axially movable into and out of such engagement; mechanical sensing means normally projecting upwardly beyond the general plane of said support surface and being deflectable downwardly in response to contact with an advancing load; and disengaging means associated with said sensing means and responsive to deflection of the same for effecting disengagement of said coupling means, said disengaging means comprising at least one element movable from a normal retracted position to an operative position engaging said thread of said worm in response to deflection of said sensing means, whereby continued rotation of said worm results in axial movement of the latter until said projections and coupling projections become disengaged.

3. In a roller conveyor as defined in claim 2; further comprising first biasing means urging said worm toward a position of engagement of said projection with said coupling projection; and second biasing means urging said element to said normal retracted position.

4. In a roller conveyor as defined in claim 3, each of said rolling elements having a shaft mounting the respective rolling element for rotation about its axis; and wherein said worm is mounted on one of said shafts axially outwardly of the associated rolling element.

5. In a roller conveyor as defined in claim 4, said first biasing means comprising at least one biasing spring bearing upon said worm and said associated rolling element and urging the former toward said position of engagement.

6. In a roller conveyor as defined in claim 4, said second gear being a double-bevel gear having two axially spaced annuli of gear teeth; said first gear meshing with one of said annuli; and wherein said drive means comprises an additional first gear meshing with the other of said annuli, a pair of sprocket wheels each coaxial and rotatable with one of said first gears, and a continuously movable drive chain engaging both of said sprocket wheels for driving the same and thereby, via said first gears, said second gear.

7. In a roller conveyor as defined in claim 4, said second gear being a belt pulley having radially directed flanges which are provided with respective annuli of gear teeth; said first gear also being a belt pulley similar to said second gear and having radially directed flanges provided with annuli of gear teeth which mesh with said annuli of gear teeth of said second gear, and a drive belt engaging and driving at least said first gear.

8. In a roller conveyor as defined in claim 15, said plurality of rolling elements comprising at least two sets of rolling elements one of which cooperates with the first-mentioned drive means, coupling means and disengaging means; and further comprising additional drive means, coupling means and disengaging means similar to the respective first-mentioned means but cooperating with the other of said sets of rolling elements.

9. In a roller conveyor as defined in claim 8, said drive means comprising a pair of first gears and a driven shaft fast with and mounting both of said first gears and extending longitudinally of said support means; further comprising at least two rotatable shaft sections each extending along one of said sets of rolling elements and composed of two portions one of which carries at least the respective second gear meshing with one of said first gears and the other of which carries at least the respective worm with the latter having limited freedom of axial sliding movement.

10. In a roller conveyor as defined in claim 9; further comprising motion-receiving gears meshing with the respective worms and each fast with one rolling element of a respective one of said sets.

11. In a roller conveyor as defined in claim 10; further comprising additional motion-receiving gears each fast with one of the remaining rolling elements of the respective sets, and further worms mounted on the respective shaft sections without freedom of axial movement and each meshing with one of said additional motion-receiving gears.

12. In a roller conveyor as defined in claim 2, said coupling portions being arranged circumferentially of the axis of rotation of said worm, and being bounded by circumferentially spaced lateral edge faces one of which is inclined to and the other of which extends in parallelism with said axis of rotation of said worm.

* * * * *